United States Patent [19]

Fredericksen

[11] 4,021,090
[45] May 3, 1977

[54] GROUND WIRE CONNECTOR
[75] Inventor: Arthur E. Fredericksen, North Haven, Conn.
[73] Assignee: Fargo Mfg. Company, Inc., Poughkeepsie, N.Y.
[22] Filed: June 30, 1976
[21] Appl. No.: 701,210
[52] U.S. Cl. .................................. 339/5 R; 339/10
[51] Int. Cl.² ......................................... H01R 39/00
[58] Field of Search .............. 339/5 R, 5 M, 5 RL, 339/5 S, 6 RL, 10

[56] References Cited
UNITED STATES PATENTS

| 3,430,179 | 2/1969 | Shoji | 339/5 R |
| 3,887,254 | 6/1975 | Landis et al. | 339/5 R |

Primary Examiner—Roy Lake
Assistant Examiner—DeWalden W. Jones

[57] ABSTRACT

A ground wire connector for grounding a conductor on a reel during stringing operations which includes structure for coupling the connector to a reel rotatably mounted on a shaft. A bearing is provided with one portion connectable to the reel so as to rotate therewith and a second portion connectable to the shaft with the one portion rotatable with respect to the second portion. The second portion is coupled with a grounded conductor and the connector provides an electrical path from the reel to the grounded conductor when connected thereto while permitting relative rotation between the reel and grounded conductor.

8 Claims, 4 Drawing Figures

GROUND WIRE CONNECTOR

BACKGROUND OF THE INVENTION

In dealing with over-head electrical lines most codes require that all conductors being strung or unstrung be grounded. When new covered conductor is being strung without deenergizing the existing conductors there is a possiblity of accidental contact with the energized line and more importantly, there is an induced voltage created that must be grounded.

When dealing with bare wire, the grounding takes place with "roller grounds", which is part of the roller system on the truck. However, with covered wire, these are ineffectual.

Accordingly, it would be advantageous to provide a grounding system for covered wire where the reel or roller containing the wire on the truck is grounded in a manner which does not affect the rotation and use of the roller or reel as the wire is being strung and unstrung.

SUMMARY OF THE INVENTION

Accordingly, with the above background in mind, it is among the primary objectives to provide a ground wire connector for grounding the conductor on the reel while the reel is in operational position on a truck without affecting the operation of the reel in its rotational movement. The connector provides a continuous electrical ground during stringing, laying or pulling operations without interfering with the free rotation of the reel. It consequently protects against accidental contact with energized conductors or dangerous induced voltage build-up. The connector is versatile and easily installed on all conductor types and sizes. It is adapted for an extended life which is enhanced by the use of a rugged sealed bearing, solid construction and field proven holding connectors to attach to the conductor on the reel, the vehicle and the ground conductor. The connector is economical and versatile in that it can be utilized with covered or bare conductors.

In summary, the reel grounding connector of the present invention includes means for coupling the connector to the conductor on a reel rotatably mounted on a shaft. It also contains bearing means with one portion connectable to the reel so as to rotate therewith and a second portion connectable to the shaft with one portion rotatable with respect to the other portion. Means are provided for coupling the second portion with a grounded conductor. Finally, the connector provides an electrical path from the conductor on the reel to the grounded conductor when connected thereto while permitting relative rotation between the reel and grounded conductor.

With the above objectives among others in mind, reference is had to the attached drawings.

DESCRIPTION OF THE PREFERRED EMBODIMENT

Figure 1:
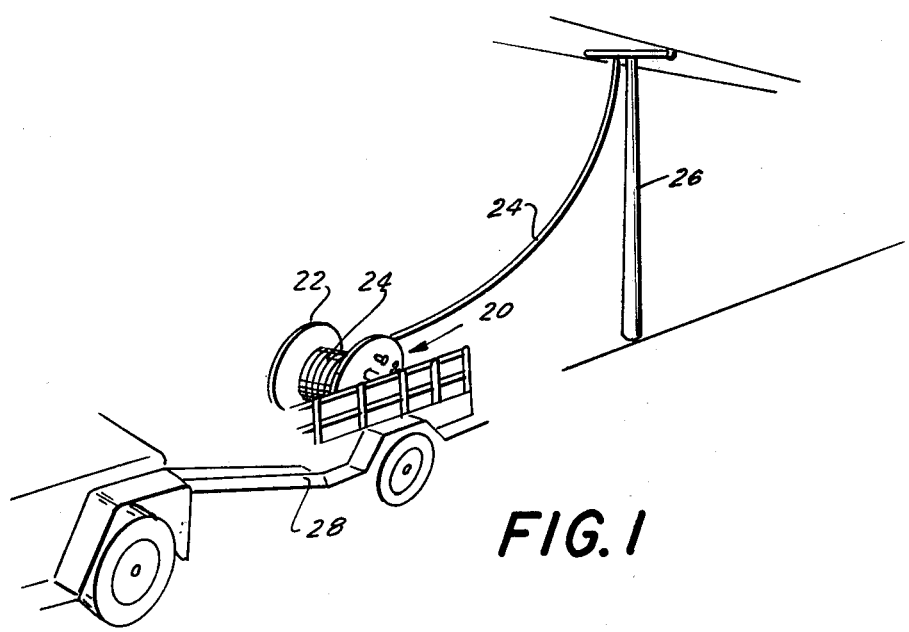
FIG. 1 is a perspective view of the connector of the invention utilized in grounding a reel mounted on a vehicle and being utilized in stringing wire.

Connector 20 is shown in a working environment in FIG. 1 of the drawings. It is shown attached to a reel 22 of insulated conductor wire 24 being strung on poles 26 along a street. The reel 22 is mounted on a conventional truck 28 and the conductor is normally pulled off the rotatable reel with the reel rotating as line 24 is played out for connection on poles 26.

Reel 22 is in the form of a conventional spool with the cable or wire 24 wound on a base supported between two opposing disc shaped walls 30 and 32. The reel is rotatably mounted on a fixed pipe or shaft 34. The shaft 34 is mounted in fixed position at both ends to a pair of upstanding walls or posts 36 on the vehicle 28. Reel 22 rotates about shaft 34 as wire is played out, as shown, or as it is wound on the reel.

Figure 2:
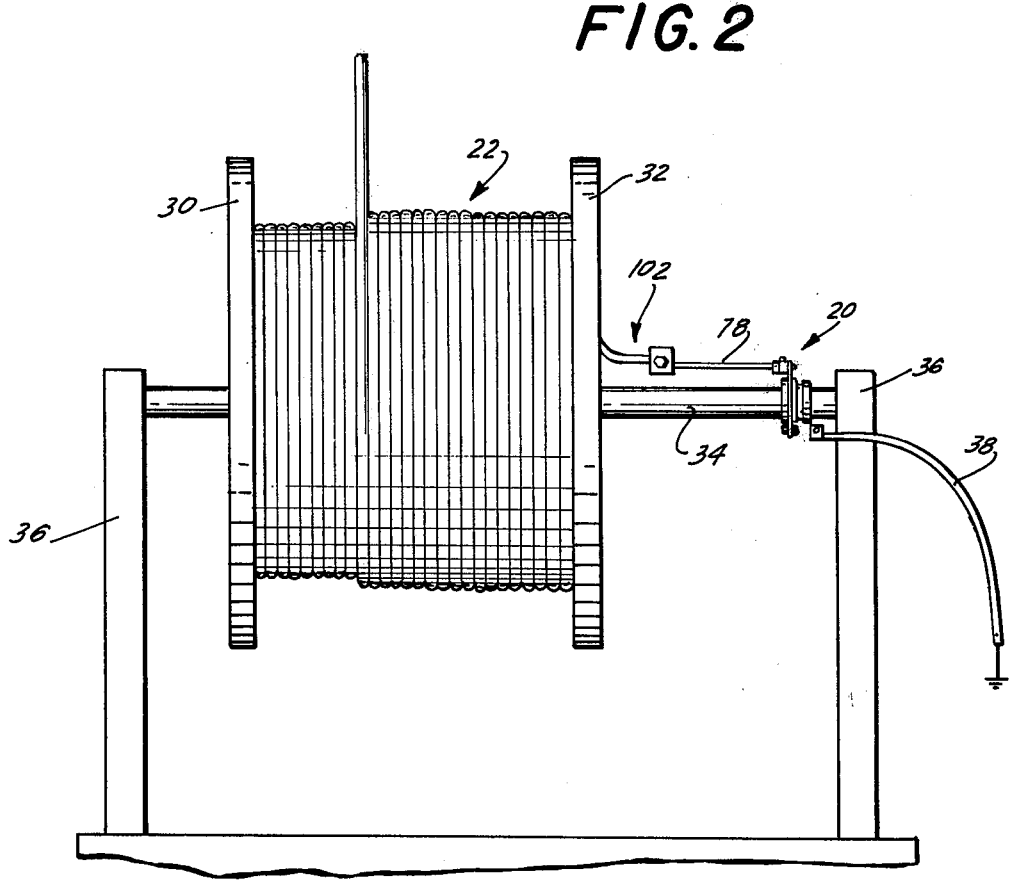
FIG. 2 is an enlarged fragmentary side elevation view thereof.

It is necessary that the conductor be grounded and for that purpose a suitable ground wire or conductor 38 is supplied which has one end terminating at ground in a conventional manner as depicted in FIG. 2. For purposes of interconnecting the ground wire 38 with reel 22 so as to ground the reel, connector 20 is employed to make the connections and permit the reel to rotate relative to the interconnected ground wire 38.

Figure 3:
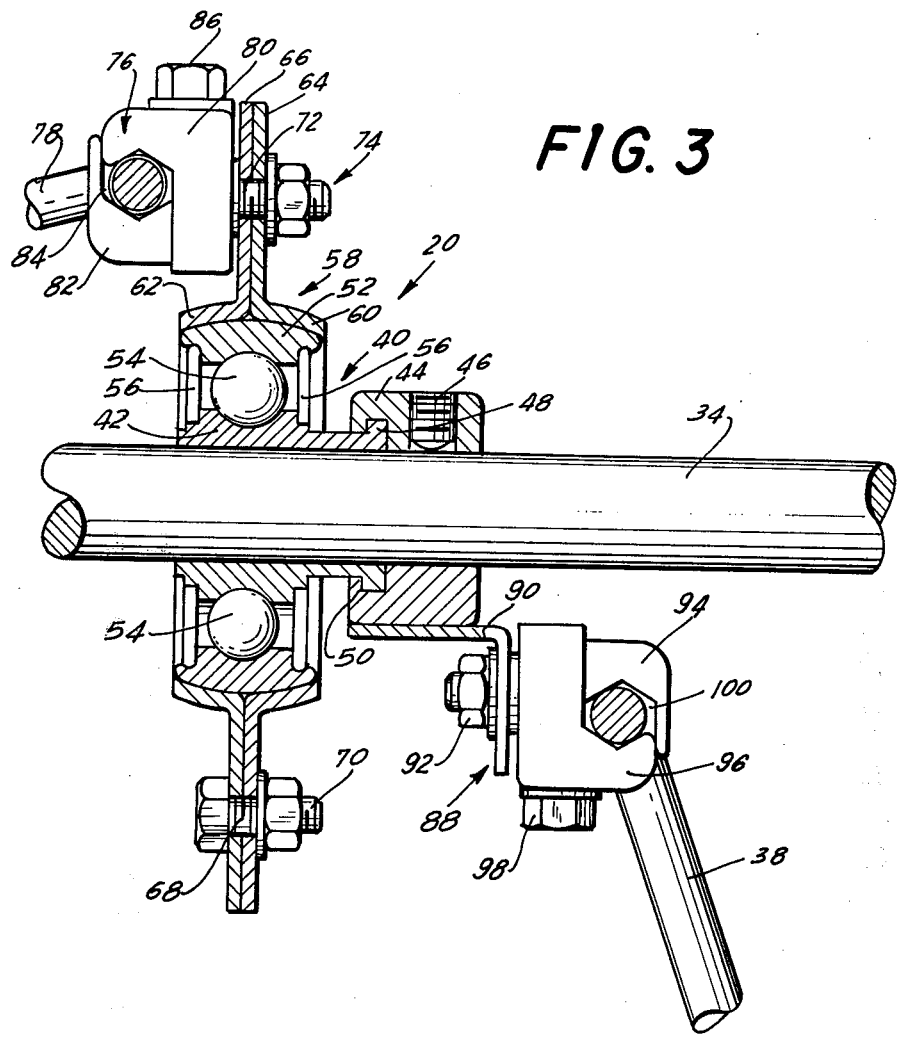
FIG. 3 is an enlarged fragmentary sectional view thereof showing the details of the connector of the invention.

The details of connector 20 are shown in FIG. 3 and include a bearing assembly 40 which has an inner race 42 rigidly mounted to shaft 34 by means of collar 44 and set screw 46. This is accomplished by engagement between the end rim on laterally extending flange 48 on the race 42 and the receiving recess in the collar.

An outer race 52 surrounds the inner race 42 and is spaced therefrom to capture a plurality of ball bearings 54 therebetween. Appropriate guiding surfaces 56 assist in caging the balls 54 between the races and guide the outer race 52 as it rotates about the inner race 42 on the ball bearing surfaces 54. The ball bearings provide multiple contact points for electrical continuity through the bearing. A housing 58 cages the bearing portion of the connector and rotates with the outer race 52 with respect to the inner race 42. The housing consists of a pair of opposing mating portions 60 and 62 which each have mating peripheral flanges 64 and 66 respectively. Appropriate openings 68 are provided in flanges 64 and 66 and are in alignment for passage of a bolt and nut assembly 70 at predetermined points about the circumference of the flanges to permit the coupling and uncoupling of the housing portions 60 and 62 upon assembly and disassembly of the bearing portion of connector 20. The flanges are part of the electrical circuit.

One pair of aligned openings 72 is coupled with a bolt and nut assembly 74 which holds a holding coupling 76. This holding coupling 76 is present for attachment to a lead 78 which is an electrical connection to reel 22. In fact, it can be a portion of the cable 24 contained on the reel.

Holding coupling 76 is a vise-like structure including a pair of jaws 80 and 82 which are arranged so as to form an opening or recess 84 which is adjustable in size depending upon threaded adjustment of bolt 86 which couples the two jaws 80 and 82 together and shifts one jaw with respect to the other. This is a conventional type of coupling and is well known in the art. One of the jaws is fixed in position by interconnection with bolt assembly 74 and the other jaw is coupled thereto and adjusted with respect thereto be means of adjustable nut assembly 86. In this manner the size of opening 84 is adjusted so that it can be opened to receive lead 78 therein and then closed to clamp lead 78 in fixed position and in electrical contact therewith.

To accomplish the connection between connector 20 and grounded conductor 38, a similar type of conventional holding coupling device 88 is employed. The device 88 is mounted to one end of an L-shaped bracket 90 which is interconnected to collar 44 in a conventional manner such as by welding. A suitable bolt and nut assembly 92 passes through the free leg of bracket 90 and holds one of the two jaws 94 and 96 of assembly 88 in fixed position. The other jaw is adjustable with respect thereto by means of adjusting bolt 98. In this manner, an appropriate adjustable receiving recess 100 is formed to initially receive the end of conductor 38 and then to be tightened about the conductor and hold it in clamped vise-like position and in electrical contact therewith.

In this manner an electrical grounding path is provided between reel 22 through conductive lead 78 and through the interconnected conductive components of connector 20 and through grounded conductor 38 when lead 78 and conductor 38 are interconnected with the connector. Furthermore, the mode of interconnection permits relative rotation of lead 78 and the attached portion of connector 20 through outer race 52 with respect to the remainder of connector 20 in fixed position along with grounded conductor 38.

Figure 4:
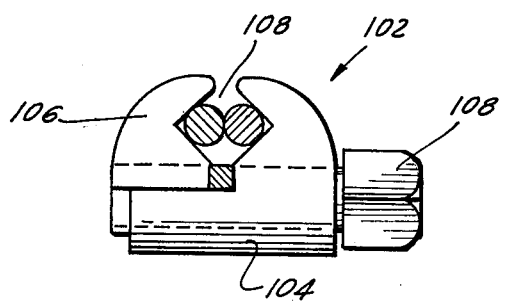
FIG. 4 is an enlarged plan view of a coupling placed in the line between the reel and the connector.

To facilitate the interconnection between conductor on the reel and the holding coupling 76, by means of lead 78, a suitable vise clamp 102 can be provided intermediate the ends of lead 78. The vise clamp 102 as shown in FIG. 4 includes a pair of adjustable jaws 104 and 106 which form a recess 108 therebetween which is adjustable in size depending upon rotation of the threaded bolt 108 which couples the two jaws together and permits their relative movement with respect to one another. This coupling 102 is also a conventional coupling well known in the art.

Coupling 102 permits ease of interchangeability of reels 22 without having to be concerned about whether sufficient length of cable is present for lead 78 to reach coupling assembly 76. An exact mating of length is not required. The coupling 102 is utilized to couple the two portions of cable together in any point along the overlapping lengths.

The resulting connector 20 which has a rotatable portion and a non-rotatable portion permits the rotatable portion to be interconnected with a rotating reel for the playing out or collecting of cable and the rigid connection of the remainder of the connector to a fixed shaft about which the reel rotates and, in turn, interconnection with a grounding conductor with an electrical path being maintained from the conductor on the reel to the grounding conductor. In this manner, the reel is free to rotate and the grounding conductor is maintained stationary and does not interfere with rotation of the reel. The result is the ability to ground covered or bare conductors during stringing, laying or pulling operations. A continuous electrical ground is maintained during all of these operations. Furthermore, protection is afforded against accidental contact with an energized conductor or dangerous induced voltage buildups. The connector is versatile and easily installed so that it can be used with many different types and sizes of conductors. The connector includes a rugged sealed bearing, is of solid construction and employs appropriate adjustable holding couplings commonly used in the field to make the appropriate connections to the reel of cable and the ground wire. The entire structure is economical in manufacture and in use for covered or bare conductors.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A rotating ground connector comprising: means for coupling the connector to a reel rotatably mounted on a shaft, bearing means with one portion connectable to the reel so as to rotate therewith and a second portion connectable to the shaft with the one portion rotatable with respect to the second portion, means for coupling the second portion with a grounded conductor, and the connector providing an electrical path from the conductor on the reel to the grounded conductor when connected thereto and while permitting relative rotation between the reel and grounded conductor.

2. The invention in accordance with claim 1 wherein the shaft is mounted on a supporting structure on a vehicle, the reel having a central aperture journaled about the shaft so as to permit the reel to rotate with respect to the shaft and the reel containing a roll of over-head electrical lines for street use whereby as the conductor on the reel is pulled off the reel can rotate and the over-head electrical lines can be unreeled.

3. The invention in accordance with claim 1 wherein the bearing means includes an inner race adapted to be mounted in fixed position on the shaft and an outer race associated therewith to house a plurality of ball bearings therebetween and holding means for retaining the outer race in position with respect to the inner race with the ball bearings in position to permit relative rotation of the outer race with respect to the inner race.

4. The invention in accordance with claim 3 wherein the inner race is provided with an axial flange extending along the shaft for engagement with a collar about the flange and shaft and a fastener applied to the collar to fasten the coupled collar and flange to the shaft in fixed position.

5. The invention in accordance with claim 1 wherein the means for coupling the connector to the reel includes a first coupling assembly formed with two jaws movable with respect to one another and adjustable fastening means for interconnecting the jaws and moving one jaw relative to the other jaw, the jaws forming a recess to receive a conductor wire from the reel therein and hold the wire to provide an electrical connection between the conductor on the reel and the connector.

6. The invention in accordance with claim 1 wherein the means for coupling the connector to a grounded conductor includes a second holding means including a pair of jaws movably interconnected to one another and a fastener for adjustably fastening the jaws together, the jaws forming a recess to receive and hold the grounded conductor therein to form an electrical connection between the connector and the ground.

7. The invention in accordance with claim 3 wherein the housing for holding the first race, second race, and ball bearings in position include a pair of opposing cylindrical sections having diametrically opposed flanges extending therefrom with the flanges in one section aligned with the corresponding flanges in the other section and an adjustable fastener for connecting each pair of flanges together so as to tighten the housing portions and retain the races and ball bearings in desired position therein.

8. The invention in accordance with claim 7 wherein the flanges of the housing sections are fastened by means of nut and bolt assemblies passing through aligned openings in each pair of flanges whereupon loosening and disassembly of the nut and bolt assemblies permits access to the interior of the bearing and the housing sections and flanges being positioned on the outer race so as to rotate therewith with respect to the inner race.

* * * * *